UNITED STATES PATENT OFFICE 2,295,481

PREPARATION OF WATER-SOLUBLE DERIVATIVES OF 2-SULPHANILYLAMIDO-PYRIDINE

Jonas Kamlet, Brooklyn, N. Y., assignor to Merck & Co., Inc., Rahway, N. J., a corporation of New Jersey No Drawing. Application March 23, 1939, Serial No. 263,727

6 Claims. (Cl. 260—296)

My present invention relates to the preparation of water-soluble derivatives of 2-sulphanilylamidopyridine and, more particularly, to soluble derivatives of 2-sulphanilylamidopyridine suitable for parenteral administrations to humans and animals in the treatment of pneumococcic pneumonias and of staphylococcic, hemolytic streptococcic, meningococcic, gonococcic and Friedlander's bacillary infections.

Since the discovery that sulphanilamide (p-aminobenzenesulphonamide) is effective in the treatment of infections due to the hemolytic streptococcus, gonococcus and meningococcus, numerous experimenters have attempted to use this compound, or derivatives thereof, in the treatment of pneumococcic pneumonias. Thus, Domagk (Deutsche Med. Wochsch., 61, 250, 1935) claimed that Prontosil, a derivative of diazotized sulphanilamide, was moderately effective against pneumococci, especially of Type III. Nitti, Bovet and Depierre (Comptes rendus Soc. Biol., 124, 16, 1937) and Buttle (Proc. Roy. Soc. Med., 31, 154, 1937) likewise reported that sulphanilamide was effective against pneumoccocci, but to a degree considerable below its effect on hemolytic streptococci. However, in spite of many favorable reports of its use per se (American Journal of the Medical Sciences, 193, 759, 1937) or in conjunction with other forms of therapy (New England Journal of Medicine, 218, 1033, 1938), the specificity of sulphanilamide is not sufficiently marked to justify its general use in all types of pneumonia.

Ewins and Phillips, of May and Baker, Ltd., Dagenham, England, have recently prepared a new derivative of sulphanilamide, 2-sulphanilylamidopyridine, which is non-toxic and chemotherapeutically active in experimental pneumococcic infections in mice. Its use in the treatment of pneumonias in humans (Lancet; 2, 14; 2, 74; 2, 564; 2, 1095 (1938)) has found widespread acceptance in England and preliminary reports from American workers (Marshall, Bratton and Litchfield, Science, 88, 597, 1938; Flippin, Lockwood, Pepper and Schwartz, Journal of the American Medical Assoc.; 112, 529, 1939) indicate that this new compound may undoubtedly be considered as the long sought-after specific against pneumonias of all types.

Long (Journal of the American Medical Assoc.; 112, 538, 1939) has pointed out that 2-sulphanilylamidopyridine may also be used with good effect in the treatment of staphylococcic bacteremias and of Friedlander's bacillary infections. There is further evidence available that it is equal, or superior, to sulphanilamide in the treatment of hemolytic streptococcus infections, meningococcemias and gonorrhea.

However, the oral administration of 2-sulphanilylamidopyridine is often complicated by a number of undesirable sequelae. Gastric irritability, nausea and vomiting were observed by Flippin and his co-workers in 96 patients of a series of 100. In ten cases, these untoward effects were so severe that it was necessary to discontinue treatment. Furthermore, 2-sulphanilylamidopyridine is relatively insoluble (0.1% in water) and its absorption by the blood stream is irregular and often delayed. Although adequate data is not yet available as to what constitutes a bacteriostatic concentration of this compound in the blood, failure of a patient to respond promptly to treatment is often due to this irregular and delayed absorption.

The purpose of this invention is, therefore, to prepare non-toxic, water-soluble derivatives of 2-sulphanilylamidopyridine of high chemotherapeutic specificity against pneumococci and suitable for parenteral administration in human therapy. By treatment via the enteral, rather than the oral, route these gastric symptoms may be avoided.

In a co-pending application (Serial No. 140,687), I have described the preparation of water-soluble derivatives of sulphanilamide by reacting that compound with sodium formaldehyde-sulphoxylate. In a similar manner, I find that by reacting 2-sulphanilylamidopyridine with sodium formaldehyde - sulphoxylate in equimolecular proportions and in a suitable medium, a new compound is obtained, 2-(p-(N-sodium methylene-sulphinate) aminobenzenesulphonamido) pyridine:

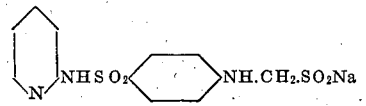

This compound may be obtained by reacting the constituents in an aqueous medium, e. g., by refluxing at advanced temperatures. Alternately, it may be obtained by converting 2-sulphanilylamidopyridine to its soluble sodium salt and refluxing a solution of the latter with sodium formaldehyde-sulphoxylate. The resultant compound, 2-(p-(N-sodium methylene-sulphinate)-aminobenzenesulphon-(N'-sodium) amino) pyridine is then reacted with one mole equivalent of dilute mineral acid to yield the mono-sodium salt.

The medium for this reaction is not necessarily limited to aqueous solution. It may readily be effected in a medium consisting of one or more members of a group of solvents consisting of the aliphatic alcohols, the aliphatic glycols and glycerin, as well as aqueous solutions of these solvents. Thus, equimolecular proportions of 2-sulphanilylamidopyridine and sodium formaldehyde-sulphoxylate in absolute ethanol are heated in the autoclave at 100° C. for one hour, and the solvent is distilled off. The 2-(p-(N-sodium methylene-sulphinate) aminobenzenesulphonamido)pyridine thus obtained is a fine, white powder, readily soluble in water. It is stable at room temperature and may readily be pressed into tablets for oral administration. The advantage of administering this compound orally lies in its marked solubility and rapid absorption by the blood stream. Alternately, the powder may be distributed in weighed amounts into evacuated ampules to be dissolved in sterile water immediately prior to injection.

2-(p-(N-sodium methylene-sulphinate) aminobenzenesulphonamido)pyridine is obtained by cooling its hot, saturated aqueous solution, in the form of white, amorphous, granular particles. These melt at 198°–200° C., with decomposition, are soluble in water at 37° C. to the extent of 16%, moderately soluble in alcohol, insoluble in acetone, ether, benzene, chloroform and ligroin. The aqueous solution is miscible and compatible in all proportions with serum, and may be administered parenterally in admixture with type-specific anti-pneumococcic serum.

This salt will reduce ferric to ferrous salts, permanganates to manganese dioxide, cupric to cuprous salts and will vat or reduce warm solutions or suspensions of dyes, such as indigo, methylene blue and crystal violet, to their leuco bases. With alkali-earth metal salts and with heavy-metal salts, it forms insoluble or slightly soluble amorphous, white compounds.

The tolerance of experimental animals to this compound is high. Rabbits and mice will tolerate perfectly repeated daily injections of four grams per kilo of body weight, over a prolonged period. The maximum tolerance of this compound when administered perorally is at least three times as great.

When reacted with an equivalent quantity of concentrated aqueous sodium hydroxide, the di-sodium salt is obtained:

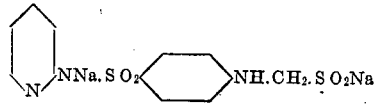

This compound is 2-(p-(N-sodium methylene-sulphinate) aminobenzenesulphon-(N'-sodium)-amido)pyridine. It is precipitated from its saturated aqueous solution as amorphous, white, granular particles, melting at 225°–230° C., with decomposition, readily soluble in water, moderately soluble in alcohol, insoluble in all other organic solvents. Although this compound is too alkaline for parenteral injection, it may readily be administered perorally or, in solution, by rectum. Its chemical properties closely resemble those of the mono-sodium salt.

When reacted with an equivalent quantity of 50% acetic acid, the free acid is formed:

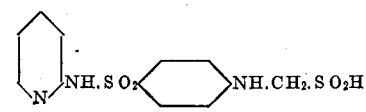

This compound is 2-(p-(N-methylene-sulphinic acid) aminobenzenesulphonamido)pyridine, obtained as white, amorphous microscopic particles melting at 206°–210° C., with decomposition. In strong mineral acids, this compound will decompose with the liberation of 2-sulphanilylamidopyridine, formaldehyde and various sulphur compounds. It is soluble in caustic alkali solutions, moderately soluble in water and alcohol, insoluble in all other organic solvents.

It is interesting to note that S. M. Rosenthal (United States Public Health Reports, vol. 49, No. 31) reports that sodium formaldehyde-sulphoxylate has a marked specificity against experimental pneumococcic infections in mice. I believe that the presence of both the 2-sulphanilylamidopyridine and the formaldehyde-sulphoxylate groups in the same compound exerts a synergistic effect and renders that compound more active than either of these groups separately.

The following example describes the preparation of a 10% aqueous solution of 2-(p-(N-sodium methylene-sulphinate)aminobenzene-sulphonamido)pyridine for parenteral injection. It is intended to define and illustrate this invention but in no way to limit it to the reagents, proportions or conditions described therein. Obvious modifications will occur to any person skilled in the art.

*Example*

Into a large, hard-glass Erlenmeyer-type flask is placed 4000 cc. of distilled water, 156.2 grams of 2-sulphanilylamidopyridine and 108.2 grams of sodium formaldehyde-sulphoxylate (analyzing 90% $HO.CH_2.SO_2Na.2H_2O$ and 10% moisture). A funnel is placed in the neck of the flask and the contents are heated to boiling. Spattering may occur, but loss is avoided as the materials deposited on the walls of the flask and funnel are washed back into the solution by condensing steam.

After boiling gently for fifteen minutes, a clear solution is obtained. The funnel is removed and boiling is continued for forty-five minutes longer. The volume of the hot solution will now be about 1800 to 1850 cc. and its pH 5.0 to 5.5. The pH is adjusted to 7.5 by the dropwise addition of a 5% sodium carbonate solution, with the aid of a potentiometer, and the volume of the solution is brought up to 2 liters with distilled water. The flask is stoppered with a wad of sterile non-absorbent cotton and allowed to cool spontaneously by standing at room temperature for an hour.

The slight sediment of unreacted 2-sulphanilylamido-pyridine that forms on standing is filtered off and the clear, pale-yellow filtrate is distributed into sterile vials and ampules. These are now sterilized in the autoclave, and sealed while hot.

Having described my invention, what I claim and desire to protect by Letters Patent is:

1. As a new compound, 2-(p-(N-sodium methylene-sulphinate) amino-benzenesulphonamido)-pyridine.

2. As a new compound, 2-(p-(N-sodium methylene-sulphinate) amino-benzenesulphon-(N'-sodium)amido)pyridine.

3. As a new compound, 2-(p-(N-methylene-sulphonic acid) amino-benzenesulphonamido)-pyridine.

4. Compounds having the formula:

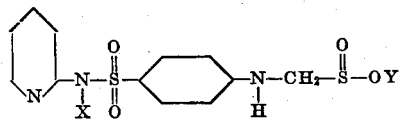

in which X and Y are taken from the class consisting of hydrogen and sodium, and in which Y is sodium when X is sodium.

5. A bactericidal pharmaceutical preparation comprising a stable sterilized aqueous solution, having a pH of substantially 7.5, of 2-(p-(N-sodium methylene-sulphinate) aminobenzenesulphonamido)-pyridine.

6. A bactericidal pharmaceutical preparation comprising a stable sterilized aqueous solution, having a pH of substantially 7.5, of 2-(p-(N-sodium methylene-sulphinate) aminobenzene-sulphon-(N'-sodium) amido)-pyridine.

JONAS KAMLET.

CERTIFICATE OF CORRECTION.

Patent No. 2,295,481.  September 8, 1942.

JONAS KAMLET.

It is hereby certified that error appears in the printed specification of the above numbered patent requiring correction as follows: Page 1, second column, line 37-38, for "aminobenzenesul phonamido" read --aminobenzenesulphonamido--; and line 52, for "amino)" read --amido)--; page 2, second column, line 74, claim 3, for "sulphonic" read --sulphinic--: and that the said Letters Patent should be read with this correction therein that the same may conform to the record of the case in the Patent Office.

Signed and sealed this 3rd day of November, A. D. 1942.

(Seal)

Henry Van Arsdale,
Acting Commissioner of Patents.